SOUND SCANNING ASSEMBLY IN A STRIP FILM PROJECTOR

Filed June 1, 1962

6 Sheets-Sheet 1

INVENTORS
MORRIS SCHWARTZ
WERNER K. BENDER
BY
Hane and Nydick
ATTORNEYS

SOUND SCANNING ASSEMBLY IN A STRIP FILM PROJECTOR

Filed June 1, 1962

*INVENTORS*
MORRIS SCHWARTZ
WERNER K. BENDER

*BY* Hane and Nydick

ATTORNEYS

SOUND SCANNING ASSEMBLY IN A STRIP FILM PROJECTOR

Filed June 1, 1962

INVENTORS
MORRIS SCHWARTZ
WERNER K. BENDER
BY
Hane and Nydick
ATTORNEYS

Feb. 1, 1966 M. SCHWARTZ ETAL 3,232,167

SOUND SCANNING ASSEMBLY IN A STRIP FILM PROJECTOR

Filed June 1, 1962

6 Sheets-Sheet 4

INVENTORS
MORRIS SCHWARTZ
WERNER K. BENDER

BY Kane and Nydick

ATTORNEYS

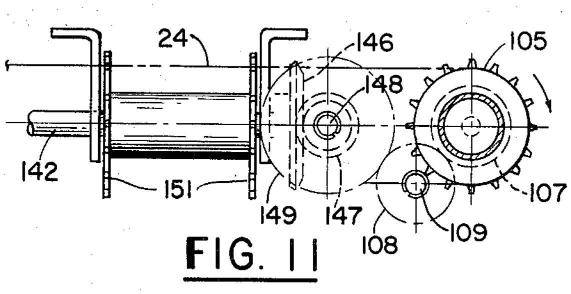
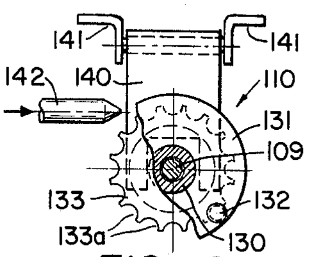
FIG. 12
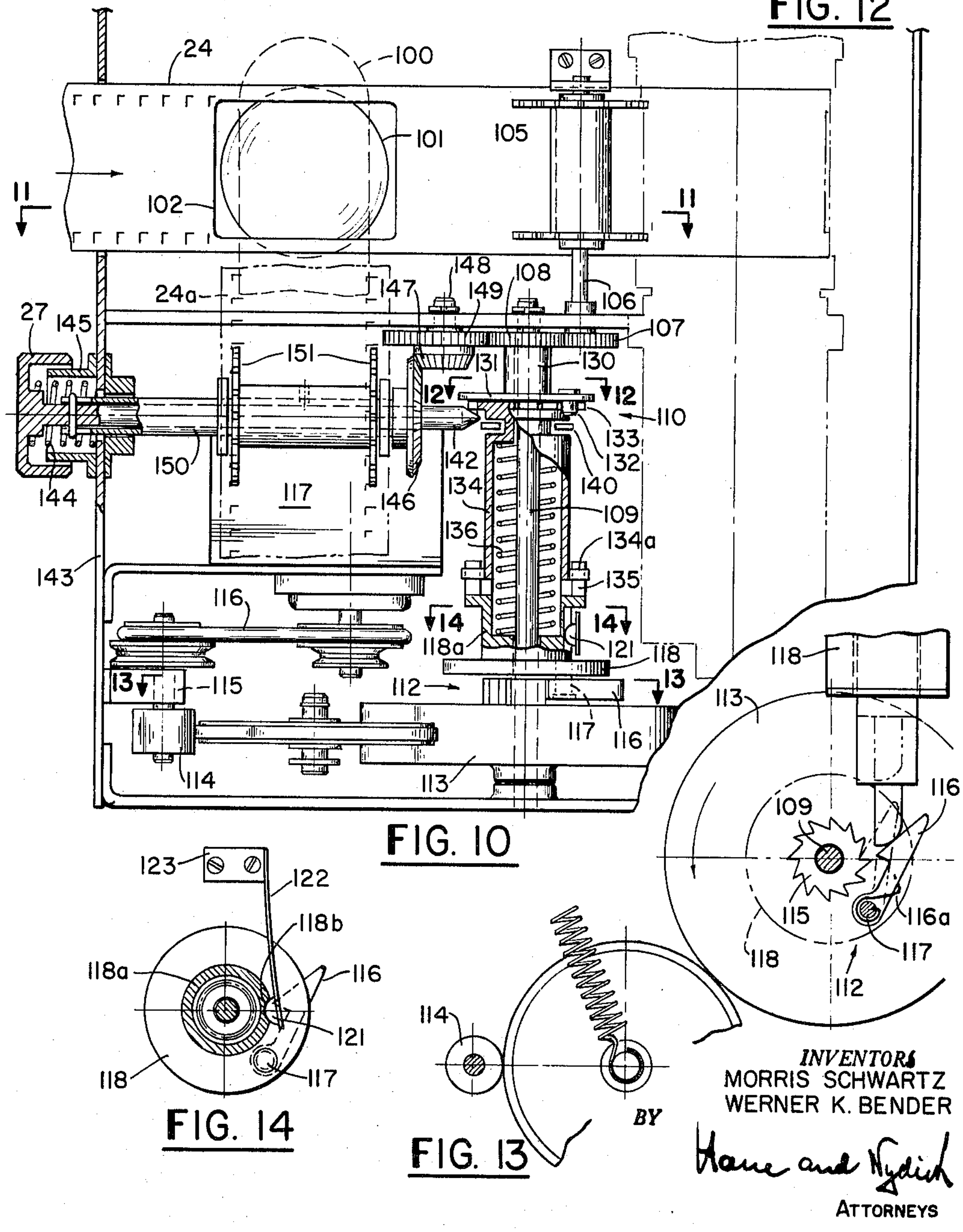
FIG. 10, FIG. 13, FIG. 14
INVENTORS
MORRIS SCHWARTZ
WERNER K. BENDER
BY
Hane and Nydick
ATTORNEYS Feb. 1, 1966 M. SCHWARTZ ETAL 3,232,167

SOUND SCANNING ASSEMBLY IN A STRIP FILM PROJECTOR

Filed June 1, 1962 6 Sheets-Sheet 6

INVENTORS
MORRIS SCHWARTZ
WERNER K. BENDER

BY Hane and Nydick

ATTORNEYS

United States Patent Office 3,232,167

Patented Feb. 1, 1966

3,232,167

SOUND SCANNING ASSEMBLY IN A STRIP FILM PROJECTOR

Morris Schwartz and Werner K. Bender, Plainville, Conn., assignors to The Kalart Company Inc., Plainville, Conn., a corporation of New York Filed June 1, 1962, Ser. No. 199,411
16 Claims. (Cl. 88—28)

The present invention relates to a sound projector for reproducing and projecting from a strip of film bearing sound record areas and picture areas.

A strip of film of this kind generally bears several picture areas and associated sound record areas. Each picture area and the associated sound record area constitute a program, and it is generally necessary or at least desirable to present several programs in sucession and to effect automatically the changeover from one program to another program upon completion of the projection and reproduction respectively of one program.

More specifically, the present invention relates to improvements on sound projections as disclosed in prior Patents 3,001,030 and 3,001,444. In sound projector designs disclosed in the aforesaid two patents, the exciter lamp of the scanning assembly of the projector is mounted on and within the projector drum which also mounts the scanning lenses of the scanning assembly, and the light from the exciter lamp impinges directly upon the scanning lenses. In such an arrangement the exciter lamp moves rotationally and axially in unison with the drum and thus participates in the drop of the drum upon completion of each scanning operation. The resulting repeated jolts to which the exciter lamp is subjected tend to shorten the life of the lamp and may also affect the light output of the same due to slight deformations of the filament of the lamp. Replacement of the exciter lamp is rather expensive and inconvenient, especially for laymen who are expected to attend to routine servicing of the projector. Furthermore, replacement of the exciter lamp may affect the characteristics of the sound reproducing system of the projector and in particular the quality of the sound reproduction.

Exciter lamps as now available in the market are rarely fully alike. There may be and usually are imperfections in the envelope of the lamp such as striations and bubbles, and the configuration of the lamp filament tends to vary from lamp to lamp. Such imperfections and variations, even though they may be minute and well within a narrow manufacturing tolerance range have a marked optical effect upon the image of the filament as seen by the scanning lenses, especially when the light of the lamp impinges directly upon the lenses. The aforementioned irregularities cannot be controlled; they vary from lamp to lamp and may cause distortion of the sound reproduction. The dissipation of the heat of an exciter lamp mounted within the drum, as is the lamp of the aforementioned prior patents, also presents manufacturing problems.

It is a broad object of the invention to provide a novel and improved sound reproduction system for a projector of the general kind above referred to in which the effect of the light as received by the scanning lenses is substantially constant even when the exciter lamp is replaced.

A specific object of the invention is to provide a novel and improved sound reproduction system for a sound projector of the general kind above referred to in which the optical assembly of the sound reproduction system neutralizes the effect of any variations of the filament image in respect to the light impinging upon the scanning lenses.

Another specific object of the invention is to provide a novel and improved sound reproduction system for a sound projector of the general kind above referred to in which the life expectancy of the exciter lamp is substantially greater than that of an exciter lamp mounted as disclosed in the aforesaid prior patents.

Still another specific object of the invention is to provide a sound reproduction system for a sound projector of the general kind above referred to in which the dissipation of the heat of the exciter lamp is greatly facilitated.

It is also a broad object of the invention to provide in a sound projector of the general kind above referred to a novel and improved control of the movements of the sound drum and of the film transportation upon completion of a scanning operation.

Another object of the invention is to provide control means by means of which any selected picture may be held stationary and the message associated therewith may be repeated as often as desired.

Other and further objects, features and advantages of the invention will be pointed out hereinafter and set forth in the appended claims constituting part of the application.

In the accompanying drawing a preferred embodiment of the invention is shown by way of illustration and not by way of limitation.

In the drawing:

FIG. 10 is a sectional view of another part of the film transport means.

FIG. 11 is a section taken on line 11—11 of FIG. 10.

FIG. 12 is a section taken on line 12—12 of FIG. 10.

FIG. 13 is a section taken on line 13—13 of FIG. 10.

FIG. 14 is a section taken on line 14—14 of FIG. 10.

Figures 1, 2, 3:
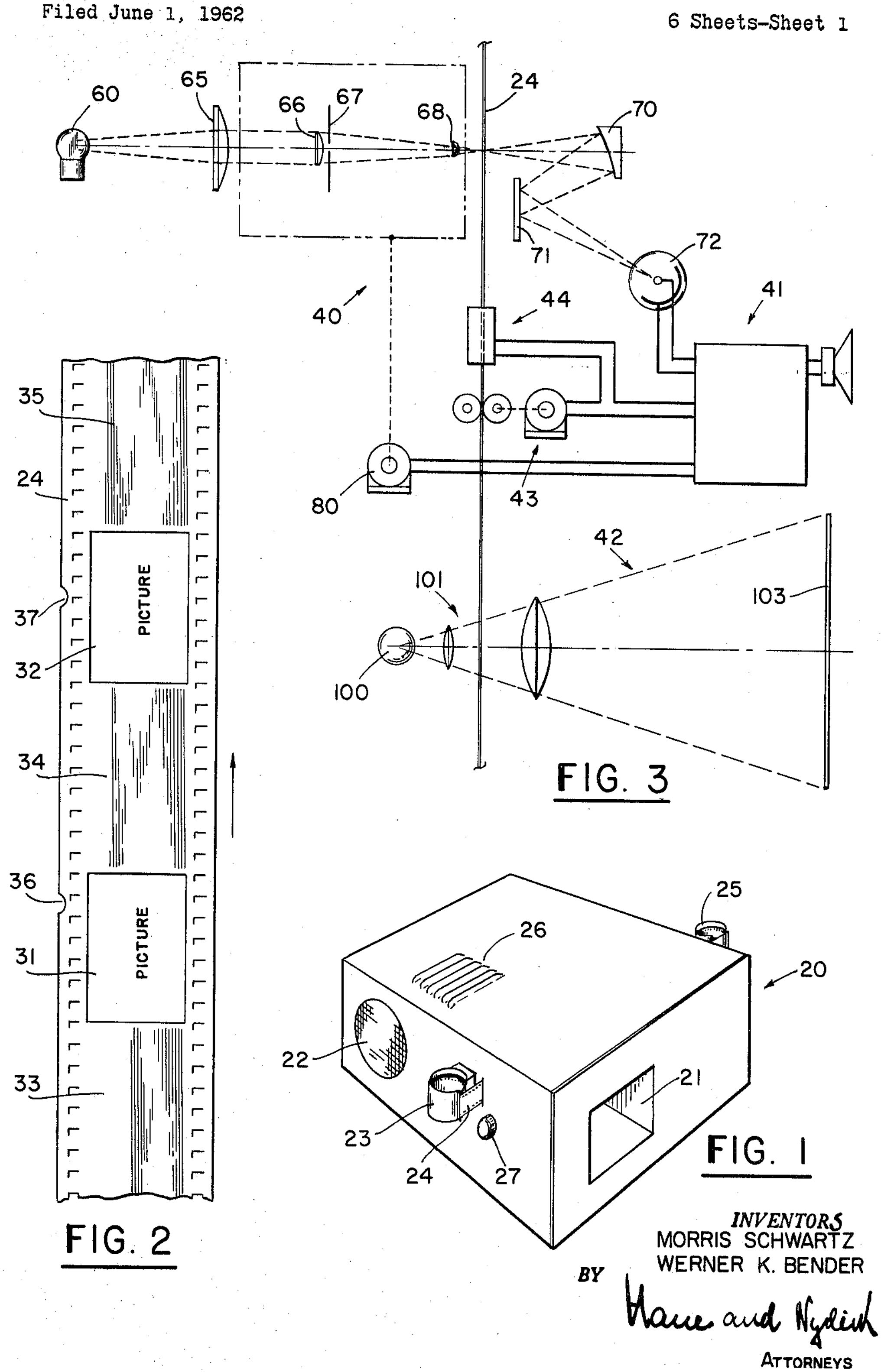
FIG. 1 is a perspective view of a sound projector according to the invention.
FIG. 2 is a fragmentary view of a strip of film suitable for use in the projector of the invention.
FIG. 3 is a diagrammatic view of the scanning assembly and the sound projecting asembly of the invention.

Referring first to FIG. 1, this figure shows the entire projector mechanism as being enclosed in a housing of generally rectangular configuration. However, it should be understood in this connection that the shape of the housing as shown in FIG. 1 is not significant for the invention; that any other suitable configuration of the housing may be provided. Housing 20 as shown in FIG. 1 has in its front wall a gate or window 21 from which the light beam of the projector may emanate. There is further shown an opening 22 for the loudspeaker, a supply reel 23 for a strip of film 24 on which the material to be projected and reproduced is printed and a take-up reel 25 for the film. Louvers 26 in the top wall of the housing and, if necessary, also in other walls of the housing facilitate dissipation of the heat. Finally, FIG. 1 shows a button 27 which serves to operate the film centering means of the projector as will be more fully explained hereinafter. In addition, there will be one of several buttons (not shown) for control of the switches and other electric components of the projector.

FIG. 2 shows a typical strip of film which may be used for projection and reproduction in a sound projector according to the invention. In this connection, reference is made to prior Patent 3,001,444 in which is shown and fully described a film strip of the kind here involved. It suffices to state for the purpose of this application that the film strip 24 should be visualized as a conventional strip of 35 mm. motion picture film but it may also be a strip of greater or lesser width such as 70, 16 or 8 mm. The strip bears a number of picture areas, two picture areas 31 and 32 being shown and a corresponding number of sound record areas, three areas 33, 34 and 35 being shown. Each picture area is associated with a sound record area and each pair thus formed constitutes a program; a number of programs may be provided on a strip. The picture areas and sound record areas are shown to be disposed alternating and in longitudinal spacing, but other spatial relationships of the picture areas and sound record areas are also feasible. It should further be understood that an associated picture and the associated sound record area need not be next adjacent to each other. In actual practice one or several picture areas and sound record areas may be interposed between a picture area and the associated sound record area to facilitate projection and reproduction in the projector as will appear more fully from the subsequent description.

The picture and sound record areas should be visualized as being produced upon the film by any suitable means, for instance, by photographic printing. Each sound record area consists of a plurality of sound track sections which in toto constitute the recording of a continuing message if sequentially scanned, starting, for instance, with the lowermost track section and continuing with the beginning of the next adjacent track section after completing the scanning of the preceding track section. The track sections are slightly slanted in reference to the longitudinal edges of the strip of film so that the track sections, when brought into a curved configuration in the projector, constitute parts of a helical line. The track sections may either occupy the entire available area or only part thereof, depending upon the length of the recorded message. The track sections may be recorded either by the variable density method or the variable area method. As may be noted, notches 36 and 37 are provided in one of the longitudinal edges of the strip of film. Each of the notches is associated with one of the sound record areas. For instance, notch 37 may be associated with sound track area 34. The notches are so correlated with the sound record areas that the location of each notch is indicative of the length of the recorded message on the respective sound record area, or in other words, each notch is an indication when the program of which the respective sound record area constitutes a part is completed. The notches are used to control the film transport mechanism of the projector as will be more fully explained hereinafter.

Turning now to FIG. 3 indicating diagrammatically the components of the projector, there is shown a scanning assembly 40 for scanning the sound track sections, a sound producing assembly 41, an optical system 42 for projecting the pictures on the strip of film, film transport means 43 for transporting the film through a predetermined distance upon completion of the program and control means 44 for controlling activation of the film transport means upon completion of a program.

*The scanning assembly*

Figures 4, 5, 6, 7:
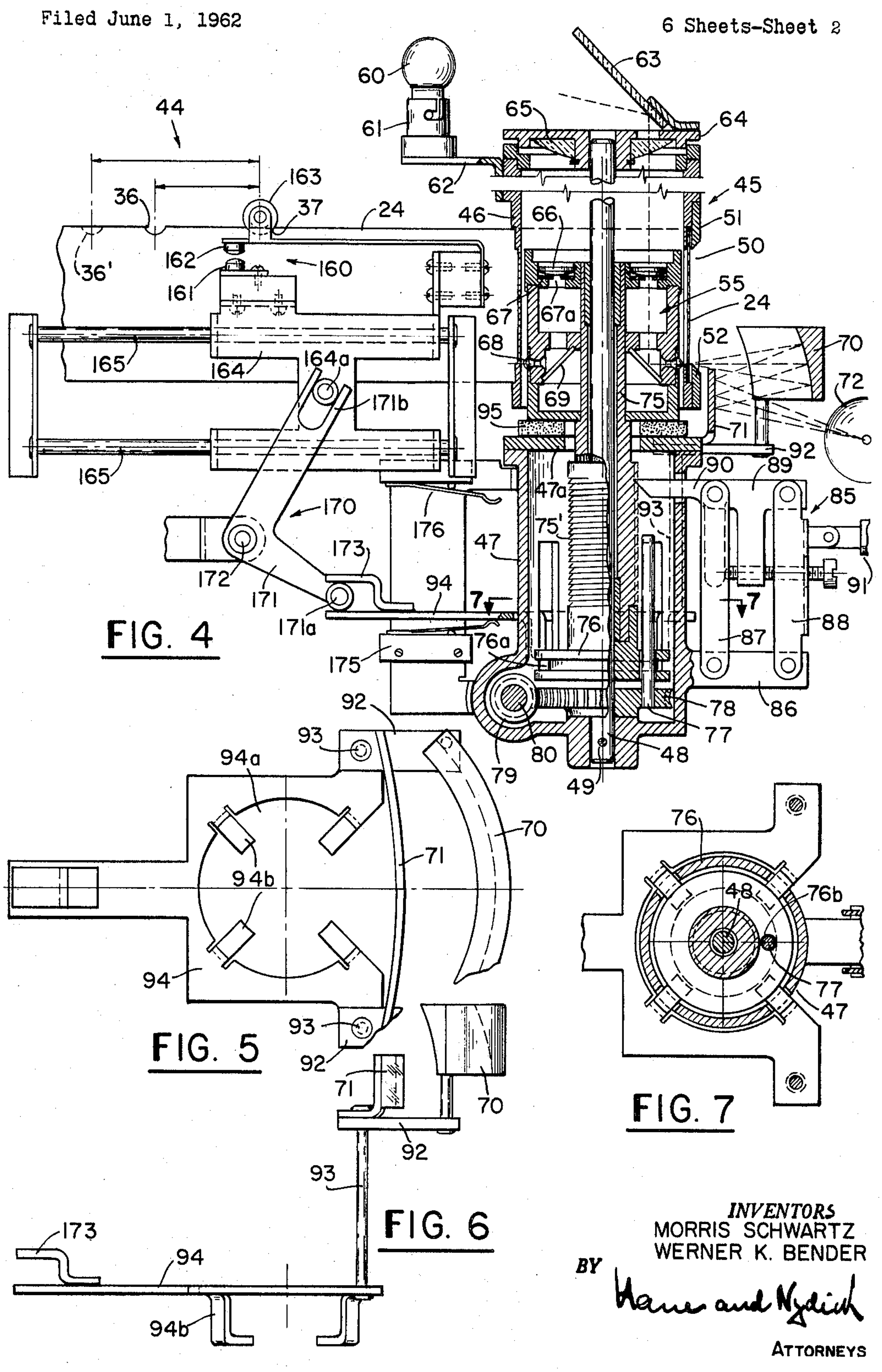
FIG. 4 is a fragmentary sectional view of the sound projector showing the scanning assembly thereof and part of the control means for controlling the scanning assembly and the film transport means.
FIG. 5 is a plan view of a component of the scanning assembly according to FIG. 4.
FIG. 6 is an elevational view of FIG. 5.
FIG. 7 is a section taken along line 7—7 of FIG. 4.
Figures 8, 8A:
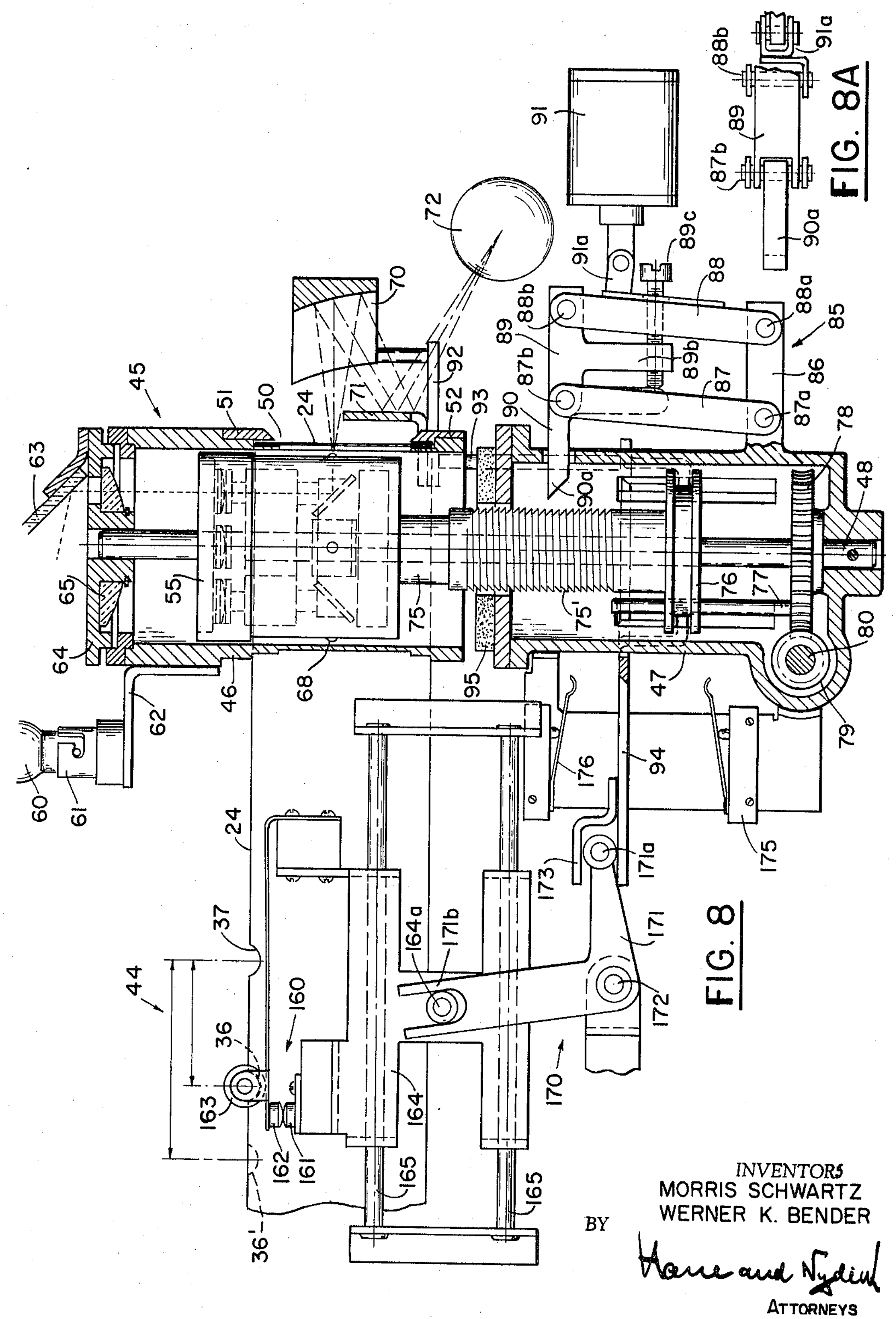
FIG. 8 is an elevational, sectional view similar to FIG. 4, but showing the scanning assembly and the control means in a different operational position.
FIG. 8A is a fragmentary plan view of FIG. 8.

The structural arrangement of the scanning assembly 40 is best shown in FIGS. 4, 7 and 8. The parts of the projector constituting the scanning asesmbly, or being related thereto, comprise a tubular casing 45 which has an upper part 46 and a lower part 47. Both parts are generally disposed in upright position and are joined by a rod 48 which extends through the entire length of both parts and is secured by any suitable means to housing part 47 at 49. Both housing parts 46 and 47 are stationary in reference to each other and rod 48. The upper part 46 has in its wall a scanning gate 50 along the longitudinal rims of which guide members 51 and 52 define guide channels for film 24 when passing past the scanning gate. As is evident, the film and with it the sound record areas thereon are constrained to a semi-cylindrical configuration when passing through the gate. The specific arrangement of the film guide means does not constitute part of the present invention and reference is made for a more detailed description to aforementioned Patents 3,001,030 and 3,001,444.

The stationary outer housing 46–47 accommodates a scanning drum 55 which is rotatable and axially slidable within the housing and is guided by and along rod 48. More specifically, the drum is movable within the upper housing part 46. It is shown in FIG. 4 in its lowermost position and in FIG. 8 in a raised position. The lowermost position of the drum is a spatially fixed one and corresponds to the beginning of a scanning operation. The raised position of the drum signifies the end of a scanning position. It is not a fixed one, but depends upon the area occupied by the track sections of the sound record area being scanned.

Drum 55 performs its rotational and axial movement during each scanning operation. More specifically, it is lifted from its lowermost position at the beginning of a scanning operation (see FIG. 4) into its uppermost position at the end of the scanning operation (see FIG. 8 which may be considered to show the uppermost drum position for the purpose of this specification). The drum performs a rotational movement while being lifted and at the end of the scanning operation it returns automatically to its lowermost position by the force of gravity.

The drive means for effecting the combined movements of the drum and the control means for controlling the drum movements will be explained more fully hereinafter.

The optical means of the scanning assembly comprise stationary optical components supported by housing part 46, movable optical components which participate in the rotational and axial movements of the drum and movable optical components which participate in the axial movement of the drum only.

Referring to FIGS. 3, 4 and 8, light for the scanning assembly is supplied by an exciter lamp 60 shown as an incandescent bulb, preferably a bulb which has a flat filament of square shape, as is indicated in FIG. 3. Lamp 60 is shown to be inserted in a socket 61 which is secured to housing part 46 by any suitable means such as a bracket 62. The light emanating from the lamp is reflected by a 45 degree angle mirror 63 secured to a cover 64 of housing part 46, upon a lens 65 mounted within housing cover 64. Lens 65 is shown as a dough-nut-shaped lens, rod 48 extending into the center hole of the lens. In this connection, it should be mentioned that lamp 60 may be mounted in alignment with lens 65 rather than laterally spaced therefrom, in which event mirror 63 or a similar light-deviating means may be omitted. It is further possible to mount the exciter lamp independently of the housing. It is only essential that the lamp is stationarily mounted, i.e., that it does not participate in the movements of drum 55. Lens 65 projects the filament of lamp 60 into infinity. The projected light impinges upon lenses 66. There is shown one pair of lenses but in actual practice several pairs, such as two pairs, should be provided, spaced 90 degrees apart. Immediately posterior of each lens 66 a mask 67 is mounted including a slit 67*a*. Lenses 66 collect the light incident upon them at a focal point and the respective slits 67*a* will appear to be evenly illuminated as viewed from the focal point of each lens 67. At the focal point of each lens, there is located another lens 68. The light emanating from the slits 67*a* is directed by a light deviating means, such as a mirror 69, upon the respective lens 68. However, it should be understood that the focal distance between each lens 66 and the respective lens 68 is represented by the combined distance between the lens 66 and the respective mirror 69 plus the distance between mirror 69 and lens 68. Lenses 68 constitute the scanning lenses proper. The specific manner in which the scanning of a sound track area is performed by the light projected by the lenses does not constitute part of the present invention. Lenses 68 correspond to lenses 30 of prior Patents 3,001,030 and 3,001,444. Reference is made to the detailed description of the scanning operations in these patents, for instance, to 3,001,030, column 5, lines 65 and following.

The light beams emanating from lenses 68 are modulated by traversing the sound tracks recorded on film 24 and the modulated beams impinge upon a toroidal mirror 70 which reflects the beams upon a mirror 71 which, in turn, reflects the beams to a photocell 72 connected to the sound reproducing equipment 41. Both mirrors participate in the axial movement of the drum but not in the rotational movement thereof. As is evident, the sound reproducing equipment will play back the sound tracks scanned by lenses 68. The sound reproducing equipment as such does not constitute part of the invention and should be visualized to be conventional and for further description, reference is made to the aforesaid two prior patents.

*Transport means for the scanning assembly*

To effect the aforedescribed, combined axial and rotational movement of drum 55 and the axial movement of mirrors 70 and 71, drum 55 is fixedly secured to a tube or spindle 75 for movement of the drum in unison with the tube or spindle. The lower end of the tube which extends into the lower part 47 of the outer stationary housing is externally threaded at 75' and mounts at its lower end a disc 76 formed with a peripheral groove 76*a*. The tube and the drum assembly are axially and rotationally slidable on the rod 48. Disc 76 is formed with an opening 76*b* through which a driving rod 77 is slidably extended. The driving rod is secured to a gear 78 which is in mesh with a worm 79 fixedly seated upon a shaft of a motor 80 diagrammatically indicated in FIG. 3. As is evident, the coupling between gear 78 and disc 76 as formed by rod 77 causes a rotation of the drum assembly when gear 78 is driven while permitting axial displacement of the drum assembly when and while the assembly is rotated.

The axial movement is imparted to the drum assembly by means of a linkage assembly 85 mounted on a bracket 86 extending from the lower housing part 47. The assembly comprises two arms 87 and 88 pivotally mounted on bracket 86 by means of pivot pins 87*a* and 88*a*. The upper ends of the two arms are pivotally linked to a T-shaped member 89 by means of pivot pins 87*b* and 88*b* so that bracket 86, arms 87, 88 and the cross arm of T-member 89 constitute a parallelogram. Pivot pin 87*b* further seats an L-shaped member 90. Arm 90*a* of this member terminates in a wedge or tooth which is movable into and out of engagement wth threads 75' on tube 75. As is evident, engagement of the tooth of arm 90*a* with the threads will cause the drum assembly to rise when and while it is rotated. The other arm 89*b* of member 89 is engageable with an adjustment screw 89*c* extending through arm 88 and threaded through a bore in the long arm of T-member 89. Screw 89*c* permits a fine adjustment of the rise of the scanning drum during a scanning operation. Turning of screw 89*c* in one or the other direction will cause a corresponding pivoting of L-member 90 about its pivot pin 87*b*, thereby correspondingly changing the thread which is engaged by the tooth when the linkage assembly 85 is tilted in counterclockwise direction as seen in FIG. 8. The linkage assembly is controlled by the state of energization of a solenoid 91 which is coupled to the linkage assembly by any suitable coupling means indicated at 91*a*.

The conversion of the rotational movement of gear 78 into the required rectilinear movement of mirrors 70 and 71 is effected by a transmission means which can best be seen in FIGS. 5, 6 and 7. Both mirrors are mounted on brackets 92 supported by rods 93 which, in turn, are mounted on a plate 94. Plate 94 has a central cut-out 94*a* into which four depending tongues 94*b* radially protrude. These tongues engage the peripheral groove of disc 76. As is now evident, an upward movement of the drum assembly in the manner previously described will cause a corresponding lifting of the assembly supporting mirrors 70 and 71 without interfering with the rotation of the drum assembly.

To return the drum assembly and the mirrors from the lifted position of FIG. 8 into the lowermost position of FIG. 4, toothed arm 90*a* is disengaged. As a result, the drum assembly and the mirrors will fall back into the lowermost position by the force of gravity. To soften the impact of the drum assembly upon a cover plate 47*a* of housing part 47, a cushion 95 is preferably provided.

As is evident, the exciter lamp 60 does not praticipate in the upward or downward movements of the drum assembly and hence is not subjected to any jar when the drum assembly returns into its lowermost position.

*Picture projecting means*

Figure 9:
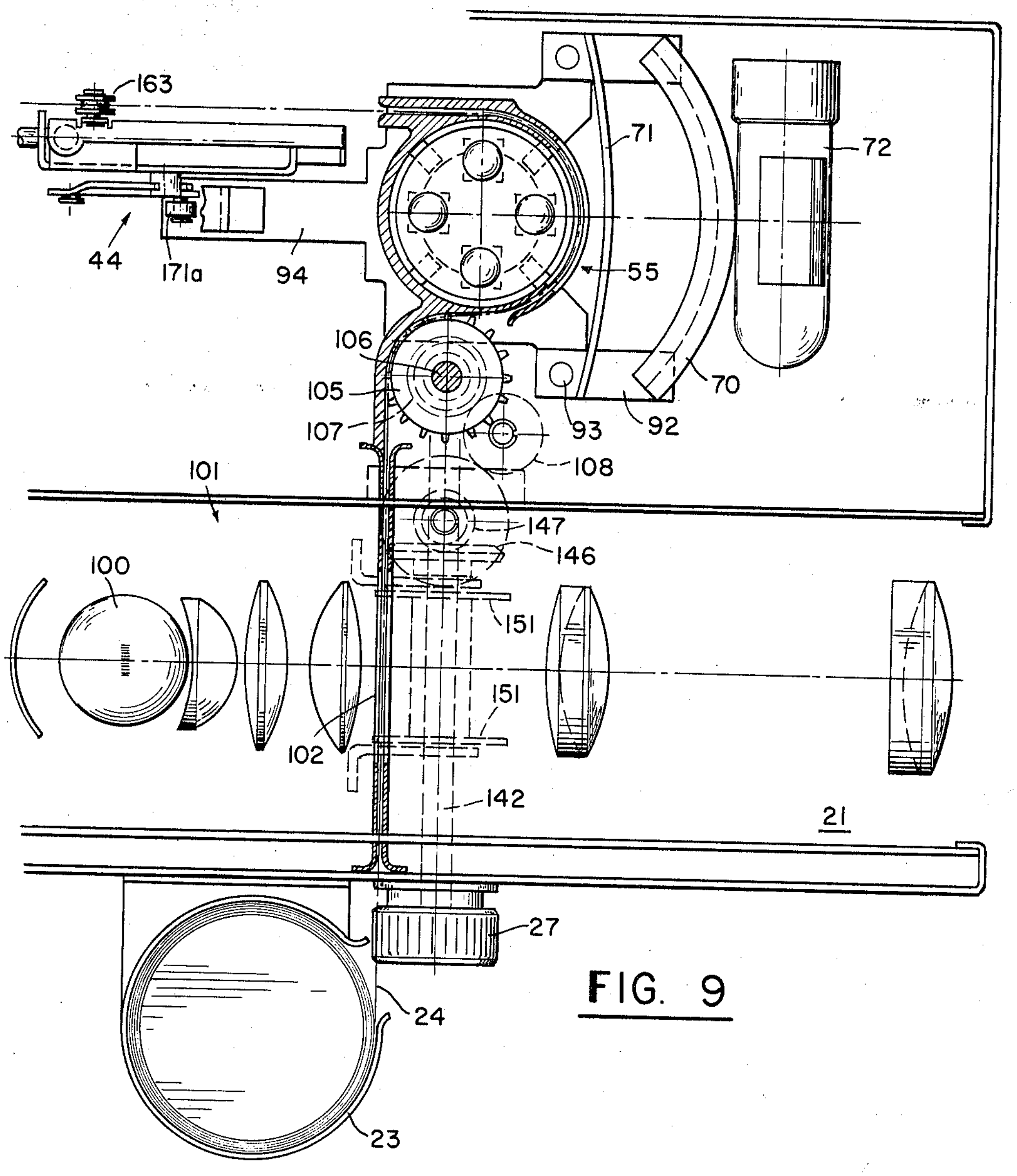
FIG. 9 is a cross sectional view of the sound projector, showing part of the film transport means and of the picture projecting assembly and also of the control means.

The picture projecting equipment 42 of the projector does not constitute part of the present invention. It is shown diagrammatically in FIG. 3 and more in detail in FIG. 9. It comprises a projection lamp 100 and a lens system 101 of suitable design. The picture may be projected through a picture gate 102 upon a suitable screen 103.

*Film transport means*

As has been explained in connection with FIG. 2, there are provided on the strip of film a plurality of programs each consisting of a picture area and an associated sound record area. The picture area and the sound record area for each program are uniformly spaced. To produce a program the sound area thereof must be located in registry with scanning gate 50 and the picture area in registry with the picture gate 102. To ready the projector for a new program, the strip of film must be transported through a distance such that the two areas of the new program (which is not necessarily the one directly following the program just produced) are in registry with the respective gates.

The film transport means are best shown in FIGS. 9 through 14. The film is driven by a sprocket 105 mounted on a shaft 106 which also seats a gear 107. Gear 107 is in mesh with a gear 108 rotatably mounted upon a stationary guide rod 109 and secured to a sleeve 130 releasably coupled to a sleeve 134 by a coupling 110. Sleeve 130 is also rotatable about guide rod 109. The lower end of sleeve 134 is joined to a collar 118*a* for rotation in unison therewith but is lengthwise slidable in reference thereto. Sleeve 134 is joined to the collar by one of several pins 135 protruding from a flange of collar 118*a* and slidably extended through corresponding bores 134*a* in a flange of sleeve 134. Collar 118*a* is secured to a disc 118 which is releasably coupled by a coupling 112 to a driven wheel 113 frictionally engaged by a wheel 114. Wheel 114 is seated on a shaft 115 coupled by a belt 116, or other suitable transmissions means, to a second motor 117. As is apparent, the rotation of the motor will be transmitted to wheel 113 and, assuming both couplings 110 and 112 are engaged, to sprocket 105. Of course, a gear drive instead of a friction drive may be provided.

Coupling 112 comprises a ratchet 115 fixedly secured to wheel 113 for rotation in unison therewith and a pawl 116 pivotally mounted on a pin 117 secured to disc 118. As can best be seen in FIG. 13, rotation of wheel 112 will be transmitted to sleeve 134 when pawl 116 is in engagement with ratchet 115. A spring 116*a* biases the pawl into engagement with the ratchet. The pawl is movable out of engagement by actuation of a solenoid 118. The control of the solenoid will be more fully explained hereinafter.

As is evident, it is essential for the correct location of the picture area and the associated sound record area in respect to the respective gates that the transmission assembly 118, 118*a*, 134 and 130 is accurately and instantly stopped when coupling 112 is disengaged. To assure such stoppage, a detent 118*b* is provided in collar 118*a* on disc 118. The detent is engageable by a nose 121 secured to one end of a leaf spring 122, the other end of which is stationarily mounted at 123 in the housing of the projector. As is evident, engagement of the nose with the detent will arrest collar 118 and with it the entire transmission assembly always in the same position.

Coupling 110 is part of an assembly permitting manual adjustment of the film in respect to the gates. Such adjustment is generally necessary at the beginning of the showing of a program and it may also be used to turn film 24 through a selected distance, for instance, when it is desired to skip certain programs. Coupling 110 is shown in detail in FIG. 12. It comprises a coupling flange 131 secured to sleeve 130. A coupling pin 132 depending from flange 131 is engageable with any one of a plurality of peripheral grooves 133*a* formed in a coupling disc 133 secured to or integral with sleeve 134 which is coupled with sleeve 118*a* rising from disc 118. A coil spring 136 abutting at one end against disc 118 and at the other end against disc 133 urges sleeve 134 upwardly, i.e., into engagement with pin 132 depending from flange 131 so that a rotation of disc 118 is transmitted to sprocket 105, disc 118 being rotated when coupling 112 is engaged as previously described.

To effect disengagement of coupling 110, a springy tongue 140 is provided. This tongue is stationarily secured at one end by any suitable means indicated as brackets 141 and is bifurcated at its other end to straddle sleeve 134 which is grooved for the purpose. A preferably pointed actuating rod 142 which is mounted axially slidable and rotatable in a casing wall 143 serves to depress tongue 140 by engagement therewith. As can best be seen in FIG. 12, movement of rod 142 in the direction of the arrow forces sleeve 134 downwardly to disengage pin 132 from the engaged groove of disc 133, thereby interrupting the transmission of the rotation of sleeve 134 to sleeve 130.

Rod 142 is urged by a spring 144 out of engagement with tongue 140. The rod supports, at its end, the cap-shaped button 27 which is slidably and rotatably guided on a collar 145 secured to casing wall 143. Rod 142 seats a beveled gear 146 which is in engagement with a second beveled gear 147 mounted on a shaft 148 also seating a gear 149. The latter gear is in mesh with the aforedescribed gear 108 in the gear train for transporting film 24 by means of the motor drive 117.

As is now evident, pressure exerted upon button 27 disengages coupling 110 and also permits turning of film sprocket 105 through gear train 146, 147, 149, 108 and 107 for either initially placing a picture area and a sound record area in alignment with the respective gates, or for moving any selected program into registry with the gates.

Rod 142 or, more specifically, a sleeve 150 mounted on the rod, seats a pair of sprockets 151 for moving a strip of film 24*a* in vertical direction past a second picture gate 102*a*.

While the horizontal advance and the scanning of film 24 are automatically controlled as will be more fully described hereinafter, it is sometimes desirable to be able to project a series of picture areas without accompanying sound. This can be effected by coupling sleeve 150 through the aforedescribed transmission means to motor 117 for vertical drive of film 24*a*. Of course, no automatic projection or reproduction is possible while film 24*a* is being transported through the apparatus.

*Control means for controlling the operations of the scanning assembly and the film transport means*

The operation of the scanning assembly at the beginning and the end of each scanning of a sound record area and the operation of the film transport means to place a new program in position for projection and reproduction are automatically controlled by signals derived from the film.

As has been explained in conjunction with FIG. 2, the film has along one of its edges longitudinal marginal notches 36 and 37, each being indicative of the length of the message recorded on an associated sound record area.

Referring now to FIGS. 4 through 6, 8 and 9, there are shown in FIGS. 4 and 8 on film 24, two notches 36 and 37, each marking the end of the sound track sections on a respective sound track area. As may be noted, the notches 36 and 37 are shown closer to each other than they are shown in FIG. 2. This indicates that the message with which notch 36 is associated is a rather brief one and that hence the track sections on that area occupy only a comparatively small part thereof. To illustrate further the dependency of the location of the notches upon the area occupied by the track sections on the respective sound record area, there is indicated in dotted lines a notch 36′ which would be the correct location of notch 36 if the track sections would occupy substantially the entire available sound track area.

The notches are utilized to control a switch 160. The switch has a stationary contact 161 and a spring contact 162. The spring of contact 162 also mounts a trolley 163 riding along the edge of film 24. As long as the trolley rides along an un-notched part of the film, contacts 161 and 162 are separated from each other, as is shown in FIG. 4, but when the trolley reaches a notch and drops into the same, contacts 161 and 162 engage each other, as is shown in FIG. 8. Both contacts are mounted on a carrier 164 which is guided on track rods 165 parallel to a plane in which film 24 is located and moves when driven by the transport means, as previously explained.

The position of carrier 164 in reference to film 24 and more specifically to the notches therein is controlled by the axial position of drum 55 in stationary housing 46, 47. To transmit the axial movement of the drum during a scanning operation to the carriage, a transmission means 170 is provided. This transmission means is shown as comprising a bell crank lever 171 pivotal about a stationarily mounted pivot 172. One arm of lever 171 is linked to bracket or plate 94 by means of a guide flange 173 forming a pocket into which extends a roller 171*a*. The other arm of lever 171 is linked to carriage 164 by means of a guide pin 164*a* on carrier 164 and a bifurcated portion 171*b* on the lever.

As has been previously explained, bracket 94 which also mounts mirrors 70 and 71 is lifted in unison with the rise of drum 55. Accordingly, lever 171 is turned in counterclockwise direction from the position of FIG. 4 towards the position of FIG. 8 as the scanning operation progresses. Consequently, carrier 164 and its trolley 163 move toward notch 36. The trolley is shown in FIG. 4 in a position in which contacts 161 and 162 are separated. It continues its travel along the edge of the film until it reaches notch 36 and settles in same, whereby contacts 161 and 162 become closed.

In addition to switch 160, the position of bracket 94 also controls a lower limit switch 175 which is a normally closed switch and an upper limit switch 176 which is a normally open limit switch. Switch 175 is opened when and while drum 55, and hence bracket 94, is in the lowermost position but closes as soon as the rise of bracket 94 begins. Switch 176 is closed by engagement with bracket 94. The upper limit switch is in the nature of a safety switch. While the opening or closing of switch 175 is necessary for the control of the operation, the operation of switch 176 is not required for normal operational control, as will appear from the subsequent discussion of circuit system shown in FIG. 17. The purpose of switch 176 is to prevent damage to the mechanism by causing drop of drum 55 to its lowermost position and with it of bracket 94 if the drum should overrun for any reason its proper or uppermost position.

Figures 15, 16:
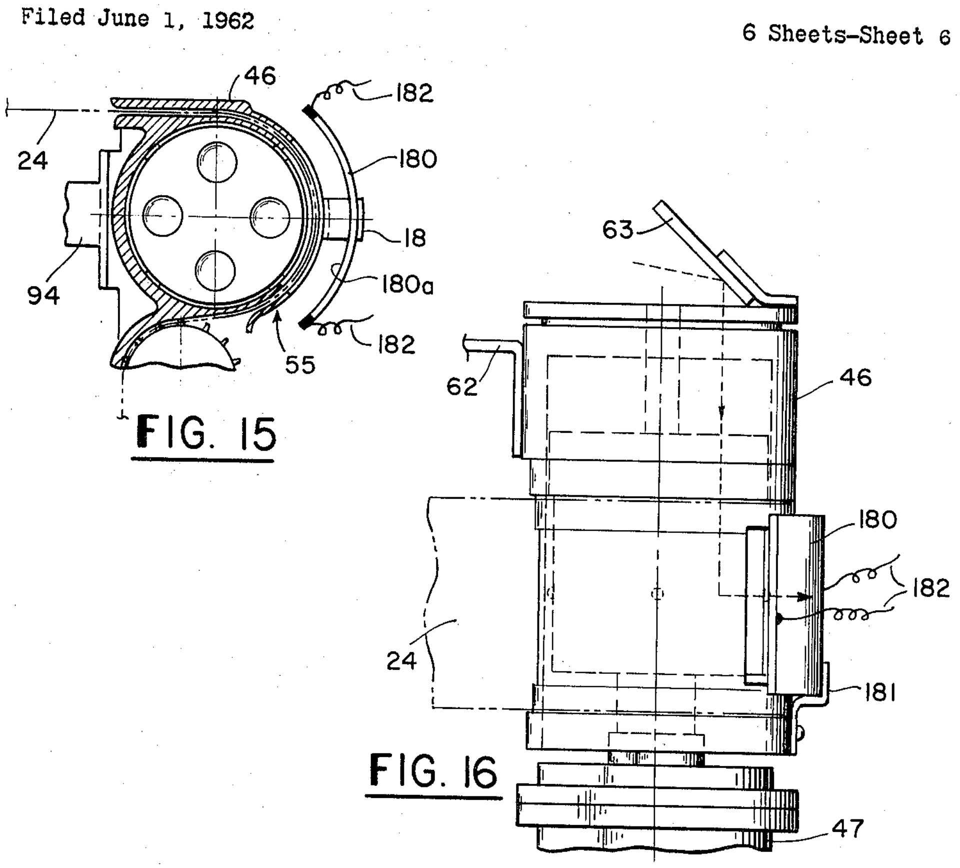
FIG. 15 is a fragmentary cross sectional view of a modification of the scanning assembly.
FIG. 16 is an elevational view of the modification of FIG. 15.

In the modification according to FIGS. 15 and 16, the mirror assembly 70, 71 and photocell 72 are replaced by a cylindrically curved member 180 coated on its side facing by a sound record area placed in the scanning gate with a photoelectrically sensitive layer 180*a*. Various layers of this kind suitable for the purpose are well known in the art and available in the market; a coating of selenium sulphide has been found to be particularly suitable. The modulated scanning beam impinging upon layer 180*a* excites the layer correspondingly. The layer is connected by leads 182 to the amplifier and loud speaker system 41 as diagrammatically shown in FIG. 3. In contrast to mirrors 70, 71, the member 180 remains stationary during the scanning operation. It may be secured to upper housing part 46 by any suitable means, such as a bracket 181.

*The electric circuit system of the projector*

An automatic presentation of successive programs requires that the picture area and the sound record area of the program first to be presented is scanned by the combined rotational and axial movement of drum 55 while the film is stationary; that at the end of the presentation, scanning is discontinued and the drum is returned into its initial position; that the film is transported through a distance such that a new program is placed in position for scanning and that the drum is again activated for a scanning operation.

Figure 17:
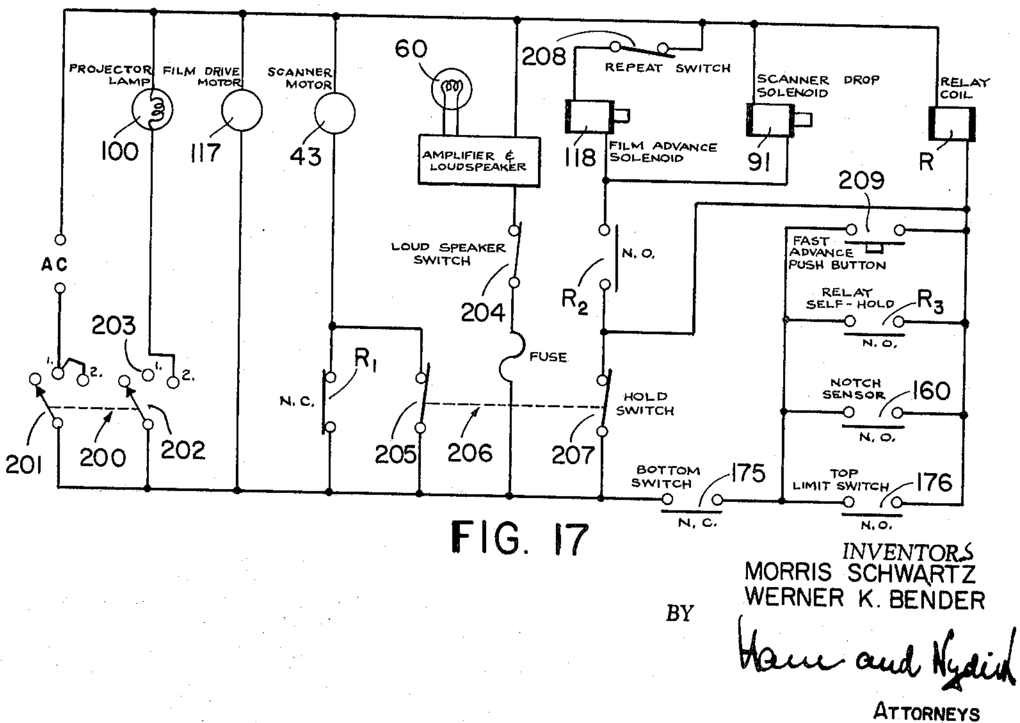
FIG. 17 is a circuit diagram of the electric components of the sound projector according to the invention.

Turning now to FIG. 17, the symbols for the heretofore described electric circuit components of the projector are designated by the same reference numerals.

To start operation, main switch 200 is operated. This switch is a two-position switch and has ganged switch arms 201 and 202. In the first position of the switch, switch arm 201 connects film drive motor 117, scanner motor 43 and loudspeaker system 41 (provided on-off switch 204 is closed) to a power line, thereby starting motors 117 and 43 and energizing the loudspeaker system, and switch arm 202 engages a dead contact 203. In the second position of the switch, projector lamp 100 is connected to the power line. The circuit of the scanner motor is closed through one switch arm 205 of a ganged switch 206. The second switch arm 207 of switch 206 is included in the circuit of the film-advance solenoid 118. Switch 206 is so ganged that both switch arms are either open or closed. The purpose and function of the switch will be more fully explained hereinafter.

A normally closed switch contact $R_1$ is connected in parallel to switch arm 205. This switch contact does not perform any function when switch arm 205 is closed; it is one of three switch contacts of a relay R, the two other switch contacts of the relay being normally open switch contact $R_2$ and normally open switch contact $R_3$.

The starting of film-drive motor 117 has no effect for the time being, but the starting of scanner motor 43 and energization of the loudspeaker system 41 initiates the scanning operation. As soon as the scanning drum begins to rise, as previously described, bottom limit switch 175 closes. Upon completion of the scanning operation, that is, upon completion of the message, notch sensor switch 160 closes by engagement with one of the marginal notches of the film, say, notch 36, thereby closing an energizing circuit for relay R. The relay closes its switch contacts $R_2$ and $R_3$ and opens its switch contact $R_1$. The opening of switch contact $R_1$ has no effect upon the operation of the scanner motor which remains energized, due to closed switch arm 205. The closing of switch contact $R_2$ closes energizing circuits for film-advance solenoid 118 and scanner solenoid 91, and the closing of switch contact $R_3$ closes a holding circuit for relay R. Energization of solenoid 118 connects the film transport to motor 117, as described, and energization of solenoid 91 releases the drum from its drive, as also previously described. As a result, the film is driven to place the next program in position for presentation, and the scanning drum drops into its lowermost position, in which it reopens switch 175, thereby interrupting the energizing circuit of relay R. The relay disconnects both solenoids; that is, the film transport is stopped and the scanning drum is reconnected to continuously running scanner motor 43. A new cycle now begins, as described.

It is sometimes desirable to repeat the audio message associated with a projected picture. Such repetition can be effected by opening a switch 208 included in the line connection of film-advance solenoid 118. As is apparent from the previous description, the aforedescribed cycle will be repeated except for activation of the film transport, which requires energization of solenoid 118, now cut off. Accordingly, the message will be repeated as long as switch 208 is kept open.

Similarly, it is sometimes desirable to hold a projected picture for further discussion, without accompanying sound. This is effected by opening switch 206, which constitutes a hold switch. As is apparent, the opening of switch arm 205 places the scanner motor under the control of relay switch contact $R_1$, thereby disconnecting the scanner motor when and while the relay R is energized. The opening of switch arm 207 disconnects film-advance solenoid 118 and scanner solenoid 91, thereby preventing transport of the film and a return of the scanner drum into its lowermost position.

The system further provides for skipping of programs until a selected program is reached. Such skipping may be effected by closing a normally open push button switch 209. This switch, when closed, maintains relay R energized (provided that holding switch 206 is closed), thereby closing the energizing circuits of solenoids 118 and 91. As a result, the film is transported until switch 209 is released. Sound may be cut off during such transport by opening switch 204.

Finally, top limit switch 176, which is a safety switch, causes energization of relay R and thus initiates dropping of the scanning drum by energizing solenoid 91 when the scanning drum rises high enough to engage switch 176, due to, for instance, a failure of notch-sensor switch 160.

While the invention has been described in detail with respect to a certain now preferred example and embodiment of the invention, it will be understood by those skilled in the art, after understanding the invention, that various changes and modifications may be made without departing from the spirit and scope of the invention, and it is intended therefore to cover all such changes and modifications in the appended claims.

What is claimed as new and desired to be secured by Letters Patent is:

We claim:

1. A sound projector for projecting images and reproducing sound respectively from a stationary strip of film bearing several photographic picture areas and associated sound record areas formed by parallel sound tracks, each picture area and the associated sound record area constituting a program, said projector comprising a stationary, generally cylindrical housing, film guide means including a scanning gate and a picture gate supported by said housing, the scanning gate being formed in conformity with the peripheral curvature of said cylindrical housing to constrain a sound record area placed therein in a correspondingly curved configuration, a scanning assembly including a drum disposed within said housing rotatable about and lengthwise slidable along the axis of said housing and said guide means, optical means supported by the housing and the drum and a socket for receiving a source of light mounted stationarily in reference to the housing and the drum, said source of light directing light into the drum and upon said optical means and said optical means directing a beam of light upon the sound record area supported on said guide means, said optical means comprising a mask including a scanning slit and mounted on the drum in the path of light emanating from said source of light to illuminate said slit, and lens means for imaging the illuminated slit upon said sound tracks, first drive means for imparting to said drum a combined axial and rotational movement moving the drum from an initial axial position in a predetermined axial direction to effect sequential scanning of said parallel sound tracks, film transport means for moving the film step by step through said guide means and past said gates, second drive means for operating said transport means, control means controlled by said scanning means upon competion of a scanning operation and controlling both said drive means, activation of the control means releasing the drum from the first drive means for return of the drum into its initial axial position and coupling the second drive means with the transport means for movement of the latter through a predetermined distance thereby placing another picture area and another sound record area in registry with the picture gate and scanning gate respectively.

2. A sound projector according to claim 1, wherein said optical means comprise a lens stationarily mounted on the housing and projetcing a beam of light incident from said source of light to infinity, a second lens mounted on the drum and disposed in the path of said beam, said second lens focusing said beam to a focal point, said scanning slit being disposed in the path of said focused beam close to said second lens to illuminate said slit by said focused beam, and a third lens also mounted on the drum and disposed at the focal point of the second lens, said third lens projecting an image of the illuminated slit upon the sound tracks.

3. A sound projector according to claim 2, wherein said first and said second lenses are mounted in optical alignment with each other, said third lens being mounted in the peripheral wall of the drum at an angle to the optical center axis of the aligned first and second lenses, and wherein a light-deviating means is monuted on the drum optically interposed between the mask and the third lens to direct the light emanating from said slit upon the third lens.

4. A sound projector according to claim 3, wherein said socket for the source of light is disposed spaced apart from the peripheral outline of the housing, and wherein a second light-deviating means deflects light emanating from said source of light upon said first lens.

5. A sound projector according to claim 1, wherein said source of light comprises an incandescent light bulb having a flat filament of substantially square shape.

6. A sound projector as defined in claim 1, wherein the sound record areas on said film include portions permeable by light and comprising electrically responsive light-sensitive means disposed in the optical path of light penetrating a sound record area being scanned, transducing means for converting electric energy into corresponding sound, and circuit means including said transducing means and said electrically responsive light-sensitive means, said light-sensitive means being excited according to the amount of light impinging thereupon after passing through the respective sound record area and energizing said transducing means accordingly.

7. A sound projector according to claim 6, wherein said electrically responsive light-sensitive means is a photocell.

8. A sound projector according to claim 6, wherein said electrically responsive light-sensitive means comprises a layer of photoelectrically sensitive material.

9. A sound projector according to claim 8, wherein said material is selenium sulphide.

10. A sound projector for simultaneously projecting images and reproducing sound, respectively, from a stationary strip of film bearing several photographic picture areas and associated sound record areas formed by parallel sound tracks, each picture area and the associated sound record area constituting a program, said projector comprising a stationary generally cylindrical housing, film guide means including a scanning gate and a picture gate supported by said housing, the scanning gate being formed in the wall of the housing in conformity with the peripheral curvature of said generally cylindrical housing to constrain a sound record area placed therein in a correspondingly curved configuration, a scanning assembly including a drum disposed within said housing rotatable about and lengthwise slidable along the axis of said housing and said guide means, optical means supported by the housing and the drum, a source of light for directing light upon said optical means and said optical means directing a beam of light upon the sound record area supported by said guide means, a first drive means for imparting to said drum a combined axial and rotational movement for moving the drum from an initial axial position in a predetermined axial direction to effect sequential scanning of said parallel sound tracks, said first drive means including an externally threaded spindle secured to said drum and mounted within said housing rotatable about and slidable along said axis, power drive means for driving said spindle and rotary transmission means coupling said power drive means to said spindle in any axial position thereof for rotating the same; normally engaged first coupling means coupling said drum to said first drive means, said first coupling means including a tooth movable into and out of engagement with the threads of said spindle, engagement of said tooth causing axial displacement of the spindle while being rotated by said power drive means; film transport means for moving the film step by step through said guide means and past said gates, second drive means for operating said transport means, normally released second coupling means for coupling said transport means to said second drive means, and coupling control means controlled by said scanning means upon completion of a scanning operation and controlling the position of said tooth of the first coupling means and said second coupling means, activation of the first coupling means by control of the position of the tooth thereof releasing the drum for return into its initial axial position and activation of the second coupling means coupling the second drive means with the transport means for movement of the latter through a predetermined distance, thereby placing another picture area and another sound record area in registry with the picture gate and the scanning gate, respectively.

11. A sound projector according to claim 10 wherein said film transport means comprise to gear train drivingly coupled with said second drive means, and wherein said second coupling means comprise a pawl and ratchet device included in said gear train as a transmission link therein, said pawl and said ratchet being movable into and out of movement transmitting engagement, the position of the ratchet and the pawl in reference to each other being controlled by said coupling control means.

12. A sound projector according to claim 10 in which said strip of film has lengthwise spaced marginal notches, the location of each of said notches being indicative of the area occupied by the sound track on a respective one of said record areas, and wherein said coupling control means comprise a switch means having a stationary switch contact and a movable switch contact, the latter being adapted to ride along the notched edge of the strip of film and to engage the stationary contact when in engagement with one of said notches, a switch mounting means, a guide track supporting said switch mounting means movable along a path parallel to the edge of said strip of film, and transmission means drivingly coupling said mounting means with said drum, said transmission means including link means coupled with said drum to participate in the axial displacement thereof and coupled with said switch mounting means to impart to the latter a movement along said guide track corresponding to the axial movement of the drum, engagement of said switch contacts controlling said first and second drive means.

13. A sound projector according to claim 12 and further comprising manually operable switch means for controlling energizing circuits for said first and second drive means to activate the same independently of said notched control switch means by actuating said manually operable switch means.

14. A sound projector for simultaneously projecting images and reproducing sound respectively from a stationary strip of film bearing several photographic picture areas and associated sound record areas formed by parallel sound tracks, each picture area and the associated sound record area constituting a program, said projector comprising a stationary, generally cylindrical housing, film guide means including a scanning gate and a picture gate supported by said housing, the scanning gate being formed in the wall of the housing in conformity with the peripheral curvature of said generally cylindrical housing to constrain a sound record area placed therein in a correspondingly curved configuration, a scanning assembly including a drum disposed within said housing rotatable about and lengthwise slidable along the axis of said housing and said guide means, optical means supported by the housing and the drum and a socket for receiving a source of light mounted stationarily in reference to the housing and the drum, said source of light directing light into the drum and upon said optical means and said optical means directing a beam of light upon the sound record area supported on said guide means, said optical means comprising a mask including a scanning slit and mounted on the drum in the path of light emanating from said source of light to illuminate said slit, and lens means for imaging the illuminated slit upon said sound tracks, first drive means for imparting to said drum a combined axial and rotational movement moving the drum from an initial axial position in a predetermined axial direction to effect sequential scanning of said parallel sound tracks, normally engaged first coupling means coupling said drum to said first drive means, film transport means for moving the film step by step through said guide means and past said gates, second drive means for operating said transport means, normally released second coupling means for coupling said transport means to said second drive means, coupling control means controlled by said scanning means upon completion of a scanning operation and controlling both said coupling means, activation of the first coupling means releasing the drum for return into its initial axial position and activation of the second coupling means coupling the second drive mean with the transport means for movement of the latter through a predetermined distance thereby placing another picture area and another sound record area in registry with the picture gate and the scanning gate respectively.

15. A sound projector for simultaneously projecting images and reproducing an audible message, respectively, from a stationary strip of film bearing several photographic picture areas and associated sound record areas formed by parallel sound record tracks, each picture area and the associated sound record area constituting a program, said projector comprising stationarily supported film guide means including a scanning gate and a picture gate, a scanning assembly including an optical scanning means mounted rotatable and also movable along a rectilinear path substantially transverse of the sound record tracks of a sound record area placed in said scanning gate, scanning drive means for imparting to said optical scanning means a scanning motion to effect scanning of a sound record area, said optical scanning means being biased to return into an initial position, film-transport drive means for moving said strip of film past said gates and through a predetermined distance, electric cycle-control means controlled by said optical scanning means reaching a predetermined scanning position and controlling said scanning-drive means and said transport means to release the optical scanning means for return into said initial position and to activate the transport drive means for driving the strip of film through said predetermined distance, and message-repeat control means coacting with said cycle control means for rendering the latter ineffective with respect to the activation of the transport drive means.

16. A sound projector according to claim 15 and comprising film-transport control means coacting with said cycle control means for rendering the same ineffective with respect to the control of the optical scanning means, thereby activating the transport drive means only in response to the control of the cycle control means by the optical scanning means reaching said predetermined scanning position.

References Cited by the Examiner

UNITED STATES PATENTS

| | | | |
|---|---|---|---|
| 2,109,627 | 3/1938 | Finch | 179—100.3 |
| 2,925,753 | 2/1960 | Schwartz et al. | 88—28 |
| 3,001,030 | 9/1961 | Maurer | 179—100.3 |
| 3,001,444 | 9/1961 | Castedello et al. | 88—28 |
| 3,108,160 | 10/1963 | Maurer | 179—100.3 |

NORTON ANSHER, *Primary Examiner.*

WILLIAM MISIEK, *Examiner.*